United States Patent
Lenssen et al.

(10) Patent No.: US 10,727,943 B2
(45) Date of Patent: Jul. 28, 2020

(54) EMBEDDING DATA INTO LIGHT (71) Applicant: SIGNIFY HOLDING B.V., Eindhoven (NL)

(72) Inventors: Kars-Michiel Hubert Lenssen, Eindhoven (NL); Frederik Jan De Bruijn, Eindhoven (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 0 days.

(21) Appl. No.: 15/757,611

(22) PCT Filed: Sep. 2, 2016

(86) PCT No.: PCT/EP2016/070682
§ 371 (c)(1),
(2) Date: Mar. 5, 2018

(87) PCT Pub. No.: WO2017/042093
PCT Pub. Date: Mar. 16, 2017

(65) Prior Publication Data
US 2018/0248621 A1 Aug. 30, 2018

(30) Foreign Application Priority Data
Sep. 7, 2015 (EP) .................................... 15184072

(51) Int. Cl.
*H04B 10/116* (2013.01)
*H04B 10/556* (2013.01)

(52) U.S. Cl.
CPC ....... *H04B 10/116* (2013.01); *H04B 10/5563* (2013.01)

(58) Field of Classification Search
CPC .......................... H04B 10/116; H04B 10/5563
See application file for complete search history.

(56) References Cited

U.S. PATENT DOCUMENTS 3,286,032 A * 11/1966 Baum .................. H03M 1/00
    341/9
4,436,376 A *  3/1984 Fergason ............. G02F 1/1393
    349/1
(Continued)

FOREIGN PATENT DOCUMENTS

RU      2397519 C2    9/2008
WO      9966367 A1   12/1999
(Continued)

OTHER PUBLICATIONS

Lenssen et al, "Bright e-skin technology and applications: simplified gray-scale e-paper", J. Soc.Info. Display 19/1, pp. 1-7 (2011), DOI# 10.1889/JSID19.1.1.
(Continued)

*Primary Examiner* — Leslie C Pascal
(74) *Attorney, Agent, or Firm* — Daniel J. Piotrowski (57) ABSTRACT

A signalling apparatus comprising: a non-light-emitting element arranged to transmit and/or reflect light from a light-emitting element, the non-light-emitting element having a variable transmission and/or reflectance respectively, and the non-light-emitting element being separate from the light-emitting element; and a controller configured to control the transmission and/or reflectance of the non-light-emitting element in order to temporally modulate the light and to thereby embed data into the light in a manner imperceptible to human vision; wherein the non-light-emitting element is arranged to transmit and/or reflect the light towards a detecting apparatus housed in a unit separate from the light-emitting element and non-light-emitting element, in order for the embedded data to be detected by the detecting apparatus.

16 Claims, 3 Drawing Sheets

(56) References Cited

U.S. PATENT DOCUMENTS

| | | | |
|---|---|---|---|
| 4,941,205 A * | 7/1990 | Horst | G06K 7/1097 |
| | | | 398/168 |
| 5,117,301 A | 5/1992 | Tsumura | |
| 6,266,037 B1 | 7/2001 | Flasck | |
| 6,493,123 B1 | 12/2002 | Mansell et al. | |
| 7,693,426 B2 * | 4/2010 | Pease | H04B 10/2587 |
| | | | 359/516 |
| 2002/0038848 A1 | 4/2002 | Chin | |
| 2005/0122559 A1 | 6/2005 | Reboa et al. | |
| 2010/0098273 A1 * | 4/2010 | Jiang | H04R 23/002 |
| | | | 381/164 |
| 2010/0245683 A1 | 9/2010 | Rancuret et al. | |
| 2011/0008062 A1 | 1/2011 | Ashdown | |
| 2012/0153025 A1 | 6/2012 | Ito et al. | |
| 2012/0262717 A1 | 10/2012 | Palumbo et al. | |
| 2013/0028612 A1 * | 1/2013 | Ryan | G01S 1/70 |
| | | | 398/172 |
| 2013/0068841 A1 | 3/2013 | Santosa et al. | |
| 2013/0341402 A1 | 12/2013 | Itakura et al. | |
| 2015/0228869 A1 * | 8/2015 | Yoo | H01L 33/54 |
| | | | 362/97.3 |
| 2015/0234217 A1 | 8/2015 | Aoyama et al. | |
| 2016/0261023 A1 * | 9/2016 | Di Nallo | H01Q 1/243 |
| 2017/0018214 A1 * | 1/2017 | Black | G02F 1/29 |
| 2017/0059151 A1 * | 3/2017 | Black | F21V 33/0052 |
| 2017/0212478 A1 * | 7/2017 | Basargin | G04G 9/0064 |

FOREIGN PATENT DOCUMENTS

| | | |
|---|---|---|
| WO | 9966376 A1 | 12/1999 |
| WO | 2006036386 A1 | 4/2006 |
| WO | 2009042289 A1 | 4/2009 |
| WO | 2014025677 A1 | 2/2014 |
| WO | 2014166491 A1 | 10/2014 |
| WO | 2015025235 A1 | 2/2015 |

OTHER PUBLICATIONS

Benson et al, "Reflective Full Color Electrokinetic Displays", Proc. IDW'11, EP4-1 (2011).

Oltean, M., "Switchable glass; a possible medium for evolvable hardware", Proc. AHS2006, Istanbul, Jun. 15-18, 2006, pp. 81-87 (2006).

* cited by examiner

EMBEDDING DATA INTO LIGHT

CROSS-REFERENCE TO PRIOR APPLICATIONS

This application is the U.S. National Phase application under 35 U.S.C. § 371 of International Application No. PCT/EP2016/070682, filed on Sep. 2, 2016 which claims the benefit of European Patent Application No. 15184072.5 filed on Sep. 7, 2015. These applications are hereby incorporated by reference herein.

TECHNICAL FIELD

The present disclosure relates to the modulation of light in order to embed data into the light.

BACKGROUND

Coded light refers to techniques whereby data is modulated into the light emitted by a light source, such as an LED-based light source. In this way the data may be said to be embedded into the light from the light source. For instance, data may be modulated into the illumination emitted by a luminaire such as an LED-based luminaire. Thus in addition to providing illumination to illuminate the environment (for which purpose a light source may already be present in the environment), the light source also acts as a transmitter capable of transmitting data to a suitable receiver of coded light. The modulation is typically performed at a high enough frequency that, despite the illumination being in the visible spectrum, the modulation is imperceptible to human vision. I.e. so the user only perceives the overall illumination and not the effect of the data being modulated into that illumination.

Data is modulated into the light by means of a technique such as amplitude keying or frequency shift keying, whereby the modulated property (e.g. amplitude or frequency) is used to represent channel symbols. The modulation typically involves a coding scheme to map data bits (sometimes referred to as user bits) onto such channel symbols. An example is a conventional Manchester code, which is a binary code whereby a user bit of value 0 is mapped onto a channel symbol in the form of a low-high pulse and a user bit of value 1 is mapped onto a channel symbol in the form of a high-low pulse. Another example is the recently developed Ternary Manchester code.

There are a number of known techniques for detecting and decoding coded light at the receive side. For example, coded light can be detected using an everyday 'rolling shutter' type camera, as is often integrated into a mobile device like a mobile phone or tablet. In a rolling-shutter camera, the camera's image capture element is divided into a plurality of lines (typically horizontal lines, i.e. rows) which are exposed in sequence line-by-line. That is, to capture a given frame, first one line is exposed to the light in the target environment, then the next line in the sequence is exposed at a slightly later time, and so forth. Typically the sequence 'rolls' in order across the frame, e.g. in rows top to bottom, hence the name 'rolling shutter'. When used to capture coded light, this means different lines within a frame capture the light at different times and therefore, if the line rate is high enough relative to the modulation frequency, at different phases of the modulation waveform. Thus the modulation in the light can be detected. Coded light can also be detected by using a global shutter camera if the frame rate is high enough relative to the modulation frequency, or using a dedicated photocell with suitable sample rate.

A luminaire that supports transmission of coded light signals can enable many applications of interest.

For example, the data embedded in the illumination emitted by a light source may comprise an identifier of that light source. This identifier can then be detected by a remote control unit, and used to identify the light source in order to control it remotely via a back channel such as an RF back channel. E.g. the remote control unit may take the form of a smartphone or tablet running a remote control application (or "app"), in which case the light sensor may be the built-in camera of the device. The app detects the identifier using the camera, and then uses this to address the light source via an RF access technology such as Wi-Fi, ZigBee or Bluetooth.

In another example, the identifier can be used for navigation, or to provide other location-based information or functionality. This is achieved by providing a mapping between the identifier of the light source and a known location of the light source, and/or other information associated with the location. In this case a device such as a mobile phone or tablet which receives the light (e.g. through a built-in camera) can detect the embedded identifier and use it to look up the corresponding location and/or other information mapped to the identifier (e.g. in a location database accessed over a network such as the Internet). The purpose of looking up the location of the device could be to help the user of the device navigate, e.g. to find his or her way throughout a large building or complex such as a hospital; and/or to determine whether the device is entitled to access some location-based service such as the ability to control the lighting in a particular room. Or in the case of mapping other information to the identifier, this could be used to look up information relevant to the location in which the light source is deployed, such as to look up information about a museum exhibit in a certain room or zone of the museum.

In yet further applications, information other than just an identifier can be directly encoded into the light (as opposed to being looked up based on an ID embedded in the light). Thus coded light can be used as an alternative (or supplement) to radio-based means of broadcasting any arbitrary data content that might be desired for the application in question.

SUMMARY

In existing systems, to create coded light, the light is modulated by modulating the amount of light emitted by the light source. However, it is recognized herein that this is not the only possible way to achieve coded light. For instance, it may be desirable to be able to embed data in the light from pre-existing or naturally occurring light sources whereby the emitted light itself cannot be modulated at the point of emission.

According to one aspect disclosed herein, there is provided a signalling apparatus comprising a non-light-emitting element arranged to transmit and/or reflect light from a light-emitting element, wherein the non-light-emitting element has a variable transmission and/or reflectance respectively. The non-light-emitting element is separate from the light-emitting element, at least in that the non-light-emitting element and the light-emitting element are not housed together in any same unit (and in embodiment neither is necessarily be housed in any unit at all). Further, the apparatus comprises a controller configured to control the transmission and/or reflectance of the non-light-emitting element in order to temporally modulate the light, and to thereby embed data into the light in a manner imperceptible to human vision. The non-light-emitting element is arranged to transmit and/or reflect the light towards a detecting apparatus housed in a unit separate from the light-emitting element and non-light-emitting element, in order for the embedded data to be detected by the detecting apparatus.

Figure 3:
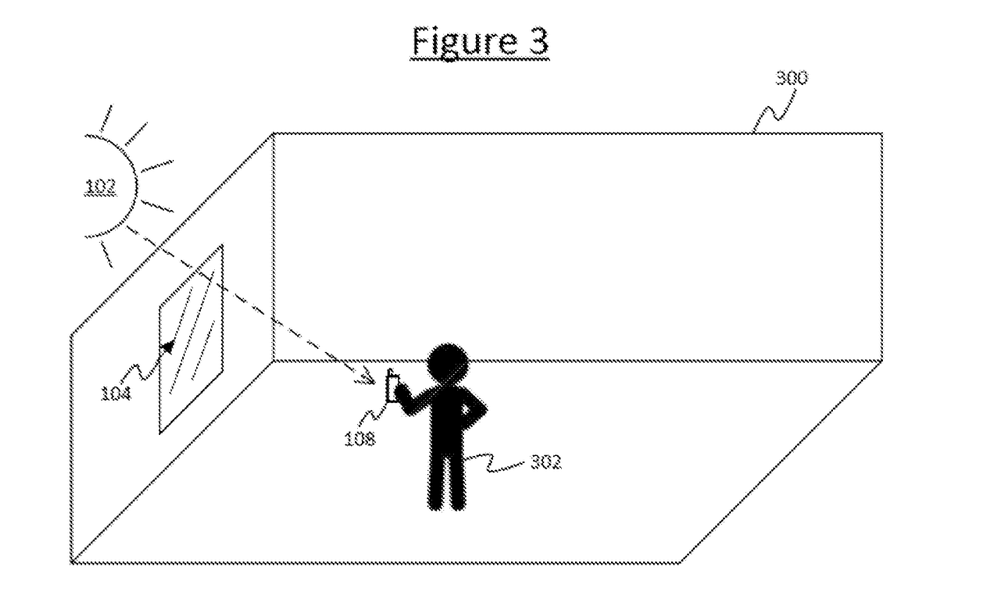
FIG. 3 schematically illustrates an example application of signalling by modulated transmission of light.

There are many possible applications of this, with the signalling apparatus taking any of a variety of forms. In various embodiments, the light emitting element may be a manmade light source, or may be the sun or another naturally occurring light source. In a particularly advantageous application, the light comprises ambient light illuminating an environment occupied by a user, e.g. daylight from the sun or illumination from a luminaire. The non-light-emitting element may be any of (or a retro-fitted layer applied over any of): a window (as shown in FIG. 3, for example); or a surface of an everyday object such as a user terminal, kitchen appliance, item of furniture, building, vehicle or item of clothing or other wearable item; or a signpost, billboard or other signage. For instance the transmittance of a window in a room may be modulated to signal an ID of the room, e.g. in order to help a user navigate the building, or to look up location-specific information about the room or location, or to conditionally provide access to a location-based service. As another example, the light-emitting element may be a luminaire, and the non-light-emitting element may be a retrofitted layer (e.g. foil or film) retrofitted over a surface of the luminaire, so as to add coded light functionality to a "legacy" luminaire not in itself equipped with this capability. Or the reflectance of a front layer of a display screen on an appliance such as a TV screen, computer monitor, laptop or tablet (reflecting ambient light from the sun or one or more luminaires illuminating the environment) may be modulated to signal an identifier of the appliance in question, so that a mobile user device such as a smartphone or tablet can control the appliance or pair with the appliance. Or as another example, the reflectance of a TV screen may be modulated to signal additional information, e.g. related content such as EPG (electronic program guide). In embodiments, this could again be achieved by means of a retrofitted layer over the screen.

Thus as exemplified, in embodiments the light may have a primary function that is perceivable to a human user, and the embedding of said data may be a secondary function not perceivable to the user. For instance the primary function may be illuminating an environment occupied by the user (light from a luminaire). Alternatively, the primary function may be providing visually perceivable information to the user, being information other than said data.

Although existing coded light does often use a pre-existing light source such as a luminaire for illuminating a room, it is recognized herein that this is still wasteful because the rapid modulation of the emitted light level (e.g. switching on an off) still consumes a significant amount of extra power. The power required to switch the transmission or reflectance of another, non-light-emitting element on the other hand consumes relatively little extra power. Hence by using a pre-existing light source that is already present for another purpose, but also modulating transmission and/or reflectance of a suitably arranged non-light-emitting element rather than the emission of light from the light source itself, then this only requires a relatively small amount of extra power in order to add embedded data to the light from a light source.

Preferably, the light emitting element does not embed data in the light it emits, such that the only modulation for purpose of embedding data in the light is by said modulation of the transmission and/or reflectance of the non-light-emitting element.

In embodiments, the non-light emitting element is separate from the light-emitting element in that it is not attached to the light-emitting element, and not attached to any unit housing the light-emitting element nor any covering disposed over the light-emitted element. In embodiments, the light emitting element is separated from the non-light emitting element by no less than 10 cm of air or free space between any two respective points on the light-emitting element and non-light emitting elements, such that the light propagates through the air or free space before being transmitted and/or reflected by the non-light-emitting element. In embodiments, the separation may be no less than 50 cm, no less than 1 m, no less than 2 m, no less than 5 m or no less than 10 m between any two points on the two elements respectively.

For avoidance of doubt, note that the term transmission herein is used in the sense of optical transmission or transmittance, i.e. the passage of light through a medium, or the degree to which an element lets light through (rather than the emitting or initial sending out of a signal). To avoid confusion, the process of communicating a signal will be referred to herein as signalling. Note also that for the purpose of the present disclosure, "transmission" and "transmittance" are used interchangeably, to refer to any measure of the passage of light through a material; and similarly "reflectance" and "reflectivity" are used interchangeably to refer to any measure of light being redirected back away from a surface of a material when incident upon that surface.

Preferably, the transmission and/or reflectivity of the non-light-emitting element is variable in that across an area of the non-light-emitting element the transmission and/or reflectance can be varied only uniformly, such that said modulation is performed by temporally varying the transmission and/or reflectance uniformly across said area. That is, where it is said that the transmission or reflectance of the non-light emitting element is varied in order to temporally modulate the light, or such like, this preferably means the transmission or reflectance at a given point is variable, and the modulation comprises varying the transmission and/or reflectance of each given point together over a same area of the non-light emitting element (as opposed to modulating by switching between using different discrete neighbouring elements having different reflectance or transmittance from one another).

In embodiments, the modulation consists only of temporally varying the transmission or reflectance uniformly across the entirety of said area. In particular embodiments of this, the non-light emitting element may be a single uniform medium (e.g. an "e-skin"), with no spatial variation in the transmission or reflectance, i.e. a continuous element rather than discrete neighbouring elements side-by-side.

Alternatively, the non-light-emitting element may comprise a plurality of different segments (discrete spatial areas), each having an independently variable transmission and/or reflectance; and the controller may be configured to control the transmission and/or reflectance of each of said segments in order to modulate the light transmitted and/or reflected by each, and to thereby imperceptibly embed different components into the light transmitted and/or reflected by each of the different segments. For instance, the non-light emitting element could be a billboard or window with a dimmable filter in the form of a film or foil applied over one surface of it (the front of the bill board or either side of the window), and this could be divided into segments. In embodiments, the different segments could signal different individual signals (independently decodable and each containing meaningful information in its own right). Alternatively the different segments could be used synergistically to signal information, i.e. information is signalled by means of both temporal and spatial modulation together (a pattern of temporally modulated segments), such that the decoder needs the sub-signal from each segment to decode.

In embodiments, the non-light-emitting element provides no dynamic visible information (so only invisible dynamic information and static visible information, such as on a billboard). In embodiments, the non-light-emitting element is a non-pixelated element, i.e. a non-matrix element.

In embodiments, the light is in the visible spectrum, and the controller is configured to perform said modulation at a frequency beyond human visual perception. In embodiments, the data comprises a sequence of symbols, said frequency being a symbol frequency of the symbols, and wherein the symbol frequency is greater than or equal to 50 Hz, or preferably greater than or equal to 100 Hz, or more preferably greater than or equal to 150 Hz or even 200 Hz. Alternatively the light may be made invisible by using light in a non-visible part of the spectrum, i.e. infrared or ultraviolet.

In embodiments, the non-light-emitting element may be a conformable layer disposed over a surface of an object, e.g. a household object. In embodiments this layer may be a retrofitted layer.

According to another aspect disclosed herein, there is provided a system comprising: a signalling apparatus comprising a non-light-emitting element arranged to transmit and/or reflect light from a light-emitting element, the non-light-emitting element having a variable transmission and/or reflectance respectively, and the non-light-emitting element being separate from the light-emitting element at least in that the non-light-emitting element and the light-emitting element are not housed together in any same unit; and a detecting apparatus housed in a unit separate from the light-emitting element and non-light-emitting element (i.e. the signalling apparatus is not housed in any same unit as the detecting apparatus); wherein the transmitting apparatus comprises a controller configured to control the transmission and/or reflectance of the non-light-emitting element in order to temporally modulate the light and to thereby embed data into the light in a manner imperceptible to human vision; and wherein the non-light-emitting element is arranged to transmit and/or reflect the light towards the detecting apparatus, with the detecting apparatus being arranged to detect the embedded data from said light.

In embodiments, the system may comprise a signalling apparatus and/or detecting apparatus in accordance with any of the examples disclosed herein.

According to another aspect of the present disclosure, there is provided a signalling method comprising: using a non-light-emitting element to transmit and/or reflect visible light emitted from a light-emitting element, the non-light-emitting element having a variable transmission and/or reflectance respectively, and the non-light-emitting element being separate from the light-emitting element at least in that the non-light-emitting element and the light-emitting element are not housed together in any same unit; controlling the transmission and/or reflectance of the non-light-emitting element in order to modulate the light at a frequency beyond human visual perception, and to thereby imperceptibly embed data into the light in a manner imperceptible to human vision; directing the transmitted and/or reflected the light towards a detecting apparatus housed in a unit separate from the light-emitting element and non-light-emitting element, such that the embedded data is detected by the detecting apparatus.

In embodiments, the method may comprise operations in accordance with any of the example features disclosed herein.

BRIEF DESCRIPTION OF THE DRAWINGS

To assist understanding of the present application and to show how embodiments may be put into effect, reference is made by way of example to the accompanying drawings in which.

DETAILED DESCRIPTION OF EMBODIMENTS

Coded light is a technology that embeds information in light, typically in otherwise normal visible light in such a fashion that the data transmission does not interfere with the primary function of the light source (e.g. task oriented illumination, ambient illumination, etc.). This is sometimes also referred to as visible light communication (VLC). The embedded information is therefore imperceptible to human observers, which is achieved by using sufficiently fast modulation frequencies.

The embedded information can be detected by any photosensitive element, or group of photosensitive elements. This can for instance be a photodiode which is part of a remote control or mounted in the ceiling as part of the lighting system, e.g. to monitor individual light contributions. This can also be an imaging sensor. For instance, the CMOS sensor in the camera of a mobile phone, such that it can provide remote control of individual lamps in a lighting system or provide product or location information in a retail environment.

The data embedded in the coded light can carry any form of digital information such as a video stream, but can also represent an identification code that is unique for each light source among a collection of light sources. Such an ID, as it were 'tags' the light source, such that it can be used for instance as a location beacon. Additionally, such an ID tags the illuminated object, such that it carries an imperceptible identifier that, e.g. allows a mobile phone to provide information about the object.

Coded light is currently produced by modulation of a light emitting element, which is often a light emitting diode (LED), but can also be a fluorescent or even an incandescent light source, provided that it can be modulated at a sufficiently high rate.

Coded light concepts have thus been used beneficially with various light sources in various applications. There are however many circumstances in which it may not necessarily be possible or desirable to modulate the emitted light, e.g. because the light source is a pre-existing 'legacy' device or a naturally occurring light source whose emission is not controllable, or because to modulate the emitted light would increase power consumption, or because to provide a controllable light source would increase cost. It would be advantageous if dynamic information could nonetheless be included in the light from such light sources. To address this or other considerations, the following discloses arrangements for generating coded light by using an unmodulated light source in combination with the modulation of the transmission or reflectivity of a surface that otherwise does not actively produce light.

The idea is to use "e-paper", "e-skin" or "smart-window" type technologies, or the like, to modulate the reflectivity and/or transmission of non-emitting surfaces or objects. The unmodulated incident light (which can be daylight or artificial light) thus becomes modulated after transmission or reflectance. At the receive side, this transmitted or reflected coded light can be detected in the same manner as is presently done with coded light originating from modulated light sources.

Technology options for implementing the modulation include technologies, such as:
- electrophoretics such as in-plane electrophoretics, for instance Philips e-Skin (e.g. see K.-M. H. Lenssen, M. H. W. M. van Delden, M. Müller and L. W. G. Stofmeel, "Bright e-skin technology and applications: simplified gray-scale e-paper", J. Soc. Info. Display 19/1, pp. 1-7, 2011) or as another example e-INK (note e-INK surfaces cannot be transparent so can only be used for reflectance);
- electrokinetics (e.g. see Brad Benson, Qin Liu, Tim R. Koch, Jeff Mabeck, Randy L. Hoffman, Devin A. Mourey, Gregg Combs, Zhang-Lin Zhou and Dick Henze, "Reflective Full Color Electrokinetic Displays", Proc. IDW'11, EP4-1, 2011);
- Suspended particle devices (e.g. http://www.smartglass.com); or
- other known technologies such as electrowetting, electrofluidics, liquid crystal, electrochromics, etc., or even micromechanical technologies like Mirasol displays or micro-blinds (note Mirasol cannot be transparent so this can only be used for reflectance).

The above technologies are in themselves known to a person skilled in the art for the purpose of switchable windows, digital signage, e-readers and e-paper displays. However, it is recognized herein that they have the potential for a new application, i.e. as a new way of creating coded light, and that the switching frequency of several of these technologies is high enough to achieve this in the visible spectrum without the modulation being perceptible to human vision (above 50 Hz and preferably above 100 Hz). Others like e-skin can at present only be switched up to about once every 300 ms, which is not quite high enough frequency to be invisible. However, in this case the modulation can instead be made invisible by modulating light outside the visible spectrum The coding functionality can be either integrated into the main functionality of the object like smart windows panels or billboards, or it can be separately added (possibly aftermarket in a retrofit manner) by applying an active foil, sticker or skin to an (possibly otherwise passive) object.

Some benefits that may be achieved by various such embodiments may include for example:
- ultra-low power consumption (compared to light-emitting coded light techniques);
- potentially lower cost since the films can be made in a high-volume roll-to-roll process and no light source is needed to be included, or films can be deposited on pre-existing substrates;
- the ability to add signalling functionality to almost any household object or other surface, e.g. by modulating the transmission or reflectance of a screen or housing of an appliance like a TV set, or attaching a conformable film or foil to an object—thus enabling potentially any object to emit signals or even be made interactive, including traditionally non-electronic objects like furniture, ornaments, etc.; and/or
- better localization, which is in particular interesting for moving objects. That is, coded light emitted from a luminaire is reflected from everything in the environment it illuminates, which sometimes makes the source of the signal difficult to localize. Whereas when the light being modulated is that already reflected once from a surface, then the coded light component is not obscured by significant further reflections from other nearby surfaces.

N.B. on a point of terminology, a film refers to a layer deposited on a substrate, whereas the substrate and layer combined could be a foil if the substrate is flexible (alternatively the substrate could be a pre-existing surface such as that of an everyday household object, which would not necessarily form a foil). Or if the material in question can be used as a substrate (has structural integrity) but does not need a separate layer deposited on to achieve the same effect (in this case the ability to modulate), that would also be a foil. So foil implies a layer comprising or being a substrate, whereas in general layer does not. Note also that the modulated element does not necessarily have to be a film or foil, e.g. as another alternative the modulatable transmittance or reflectance may be an integral property of, say, a sheet of transparent or translucent solid material such as smart window.

Some examples of various embodiments are now discussed in more detail in relation to FIGS. 1 to 4.

Figure 1:
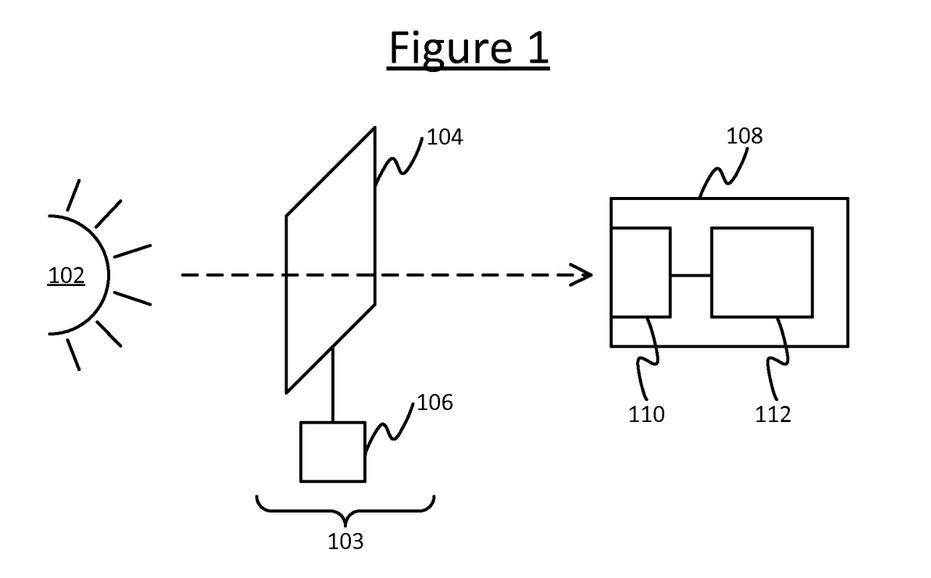
FIG. 1 is a schematic diagram of a communication system comprising a signalling apparatus and a detecting device, wherein the signalling apparatus signals by modulated transmission of light from a source to the detecting device.
Figure 2:
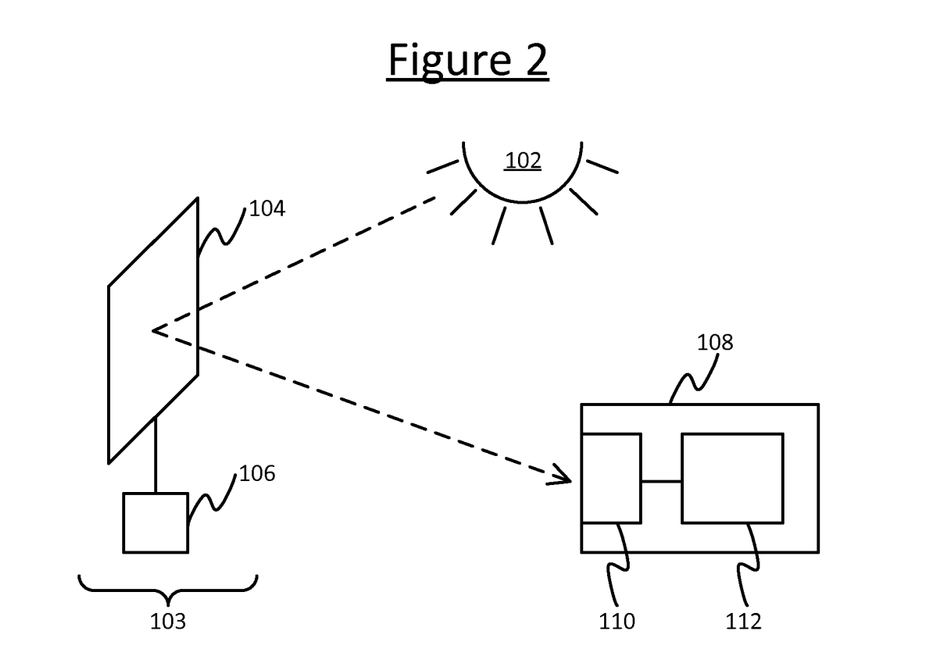
FIG. 2 is a schematic diagram of another communication system comprising a signalling apparatus and a detecting device, wherein the signalling apparatus signals by modulated reflection of light from a source to the detecting device.

FIGS. 1 and 2 each illustrate a system comprising: (i) a light source 102 comprising a light-emitting element, (ii) a signalling apparatus 103, and (iii) a detecting apparatus 108.

The light source 102 is arranged to, or happens to, emit light, preferably in the visible spectrum. It may be a naturally occurring light source such as the sun, or a manmade light source such as a luminaire for providing illumination. The light as emitted from the light source 102 is unmodulated, in that it is constant or at least has no information signal embedded in it ("unmodulated" does not necessarily exclude dimming or such like, i.e. pseudostatic adjustments to the overall level or other property of the emitted light that do not communicate data).

The signalling apparatus 103 comprises a non-light-emitting element 104 and a controller 106 operatively connected to the non-light emitting element 104. The non-light-emitting element 104 does not emit any light of its own. Rather, the non-light-emitting element 104 is arranged to either transmit (pass) or reflect at least some of the light from the light source 102 towards the detecting apparatus 108. FIG. 1 schematically illustrates the case of transmission, and FIG. 2 schematically illustrates the case of reflection. The controller 106 may be housed together in the same unit as the non-light-emitting element 104, e.g. same appliance, or may be separate. As will be exemplified in further detail shortly, the non-light-emitting element 104 may take any of a variety of forms, such as a window pane, a front layer of a display screen, or a flexible film or foil disposed (e.g. retrofitted) over a household object.

The non-light-emitting element 104 has a variable transmittance or reflectance, whereby a property of the light transmitted or reflected by the non-light-emitting element 104, respectively, is controllable via the connection from the controller 106 to the non-light-emitting element 104. In embodiments the varied property is the amount of light transmitted or reflected (i.e. the proportion of the incident light that is transmitted or reflected), but potentially the modulated property could be another property such as the polarization or wavelength of the light that is transmitted or reflected (e.g. liquid crystal can be used to modulate polarization). The controller 106 is thus able to modulate a signal into the light by modulating this property via the connection from the controller 106 the non-light-emitting element 104, which may be either a wired or wireless connection. The controller 106 itself may be implemented in the form of control software arranged to run on one or more processors, or dedicated hardware circuitry, or configurable or reconfigurable hardware circuitry such as a PGA or FPGA, or any combination of these options.

Thus the signalling apparatus 103 is configured to modulate the originally-unmodulated light emitted by the light source 102. Where modulation is described below as being performed by the signalling apparatus 103, it will be understood this is a short-hand to mean that the transmitting or reflecting element 104 adds the modulation to the light under control of the controller 106.

The modulation may be performed using any suitable modulation scheme, e.g. a line code such as NRZ (non return to zero), Manchester coding or Ternary Manchester; or generally any means of modulation based on various techniques such as amplitude modulation, frequency modulation, phase modulation, pulse width modulation, pulse position modulation, etc. Note also that modulating or switching as referred to herein does not necessarily have to mean switching between completely on and completely and off, i.e. between a transmittance of 0% and 100% or between a reflectance of 0% and 100%. Rather, it is also possible to switch between two or more discrete levels in order to encode the data, e.g. between 80% and 90% transmittance, or between 10% and 20% reflectance (where the percentage may be of any suitable property of the light, e.g. transmitted or reflected power or intensity, or amplitude, or change in polarization). In fact, when the modulation covers only a part of the total transmission or reflectance range, this can enable higher modulation frequencies. Further, the modulation does not even have to be between discrete levels, and instead one could modulate the transmittance or reflectance in a continuously variable (or effectively continuously variable) manner according to an analogue modulation scheme.

Preferably, the light emitted by the light source 102 and modulated by the apparatus 103 comprises visible light. In this case, the signalling apparatus 103 is configured to perform the modulation at a frequency that is imperceptible to human vision (only detectable by one or more detecting devices, as opposed to a human observer). This could mean imperceptible to the average user, or to all users in the world (all possible users). Typically the signal comprises a sequence of discrete symbols, e.g. in the case of regular (binary) Manchester coding, each symbol is either an on-off pulse to represent a bit of data content of value 0 or an off-on pulse to represent a bit of data content of value of 1, or vice versa. In such cases, to be imperceptible the symbol frequency should be higher than 50 Hz, and preferably higher than 100 Hz, or more preferably higher than 150 Hz or even 200 Hz.

The detecting apparatus 108 comprises a light sensor 110 such as a camera or dedicated photocell, and a decoder 112 operatively connected, housed together in a unit such as a smartphone, tablet, laptop, dedicated remote control unit, or other portable or static user device. The detecting apparatus 108 is housed in a unit separate from the light source 102 and the signalling apparatus 108, i.e. the light source 102 is not housed in the same unit as the detecting device 108 (nor necessarily housed in any unit, e.g. in the case of the sun). In embodiments, the light sensor 110 of the detecting device 108 may be separated from the light source 102 by a shortest straight-line distance (i.e. between the closest points on the surface of the two components) of greater than 0.1 m, or greater than 0.5 m, or greater than 1 m, or greater than 2 m, or greater than 5 m, or greater than 10 m. The unit in which the detecting apparatus 108 is housed is also separate from the signalling apparatus 103. I.e. the signalling apparatus is not housed in the same unit as the detecting device 108 (nor necessarily housed in any particular unit, e.g. in the case of a window, or a film attached to the exterior of an object). In embodiments, the light sensor 110 of the detecting device 108 may be separated from the non-light-emitting element 104 of the by a shortest straight-line distance of greater than 0.1 m, or greater than 0.5 m, or greater than 1 m, or greater than 2 m, or greater than 5 m, or greater than 10 m. Further, the signalling apparatus 103 may be separated from the light source 102, again not being combined into a housing of a same unit (nor indeed necessarily being housed in any particular unit), and in embodiments the non-light-emitting element 104 being separated from the light source 102 by a shortest straight-line distance of greater than 0.1 m, or greater than 0.5 m, or greater than 1 m, or greater than 2 m, or greater than 5 m, or greater than 10 m.

The non-light-emitting element 104 of the signalling apparatus 103 is arranged to either transmit or reflect at least some of the light from the light source 102 towards the light sensor 110 of the detecting apparatus 108, so as to be captured by the light sensor 110. In the case of reflection, in embodiments the reflection is preferably diffuse or lambertian ("paint like") as opposed to specular ("mirror like"). However, specular reflection is not precluded either. Note also that the light-emitting element 102 and non-light-emitting element 104 are separated by air or free space, such that the light travels from the light-emitting element 102 to non-light-emitting element 104 via the air or free space before the described transmission or reflection by the non-light-emitting element 104. Similarly, the non-light-emitting element 104 and light sensor 110 are separated by air or free space, such that the light travels from the non-light-emitting element 104 to the light sensor 110 via the air or free space before the described detection by the light sensor 110. Indeed, coded light is sometimes also referred to as free-space optical communication.

The light sensor 110 is arranged to capture the light transmitted or reflected from the non-light-emitting element 104. In embodiments, the light sensor 110 may take the form of a camera such as a rolling-shutter camera or global-shutter camera, or may take another form such as a dedicated photocell. The decoder 16 may be implemented in the form of software stored on a memory of the receiving device 108 and arranged to run on a processor of the receiving device, or could alternatively be implemented in hardware or any combination of hardware or software.

By whatever means implemented, the decoder 112 is configured to decode the embedded signal received in the light captured by the light sensor, based on any of a number of known techniques. For instance one way to detect coded light is to use a rolling-shutter camera whereby the image capture element is divided into a plurality of lines, and each frame is exposed line-by-line, i.e. the exposure of each successive line being offset in time relative to the previous line. Thus a respective sample of the light is captured from each line, each representing the modulated light level at slightly different point in time. The decoder 112 then combines the samples from the different lines in a frame to recover the signal or parts of the signal (and if the message lasts longer than one frame, it also stitches together the parts from the different frames). Alternatively however, it is also possible to detect coded light with other means such as a global-shutter camera or a dedicated photocell if the frame rate or sample rate (respectively) is high enough relative to the symbol rate of the signal. Techniques for detecting coded light in themselves are known in the art, and will not be discussed in more detail herein. In embodiments, the signalling techniques of the present disclosure may advantageously be used to send signals for detection by conventional coded light detection means, e.g. an app running on a user terminal such as a smartphone or tablet and using the inbuilt rolling-shutter camera of the user terminal to capture the coded light.

Some example applications of modulated transmission of light are now discussed in relation to FIG. 3.

In the scenario illustrated in FIG. 3, the light source 102 takes the form of the sun, and the non-light-emitting element 104 takes the form of a transmitting element having a variable transmittance. Specifically in the illustrated scenario, the transmitting element 104 takes the form of a window installed in room 300, arranged to allow unmodulated daylight from the sun 102 to enter into the interior of the room 300. The window 104 is formed from a material such as smart glass which is transparent or translucent, allowing light to pass through but with a variable (and controllable) transmittance. The controller 106 is arranged to modulate the transmittance of the window 104 in order to introduce a signal into the light entering the room 300 (i.e. so the light outside the room is unmodulated but the light admitted into the room 300 by the window 104 is modulated). The controller 106 (not shown in FIG. 3) could be located anywhere and connected to the window 104 by wired or wireless means, e.g. it could be embedded in the window frame or could be a wireless controller disposed elsewhere in the room.

As a variant of the above, the non-light-emitting element 104 may take the form of a retrofitted transparent or translucent film with modulatable transmission applied over a surface of a traditional "dumb" window.

Note that the term "window" as used herein can refer to any element covering an aperture in a room 300, while allowing light to pass through the aperture into to the room 300. Also the room 300 could more generally be any space occupiable by a human user, with the window being in any surface bounding that space. Thus the window 104 could be a conventional window through an exterior wall of a building, or a skylight in the roof of a building, or a window of a wall of partially-enclosed space, or a side window or sunroof of a car, etc.

The detecting device 108 may take the form of a portable user terminal such as a smartphone, tablet or laptop, having a light sensor 110 in the form of an in-built camera, and running an application ("app") implementing the decoder 112. In this case, the application is configured to use the camera 110 to detect the signal that has been added to the light entering through the window 104, and to provide associated functionality to a user 302 of the user device 108.

For instance the signal introduced into the light by the window 104 may comprise an ID of the window, or an ID of the room 300, or an ID of the building the room 300 is in; and the app running on the user device 108 may be configured to provide the user 302 with location-based functionality based on detecting the embedded ID introduced by the window 104. In one such application, this functionality may comprise detecting an approximate location of the user device 108 on a map or floorplan, e.g. to detect its approximate map coordinates, or the location of the room within the building, or at least detect which building it is in. This is achieved by detecting the embedded ID in the light detected by the user device 108, and then accessing a location database to look up information mapped to the detected ID, such as the GPS or other such map coordinates of the room 300, or an indication of the location of the room on a floorplan, or a name of the room or address of the building. And/or, if windows on different walls have different IDs (or only one window emits an ID), then in some embodiments the orientation (direction) of the camera 110 may even be determined.

In order to look up such information, the database may be stored locally on the mobile user device 108, or it may be stored on a server (comprising one or more server units at one or more sites) and the application may access the database via one or more networks to which the user device 108 is able to connect, such as the Internet.

Alternatively or additionally the information in the database could comprise other information relevant to the room 300, e.g. information on a museum piece or exhibit in the room, or location-specific advertising.

As another example, the embedded ID could be used to check whether the user device 108 is entitled to access a certain location-dependent service, such as the ability to control a utility in the room like lighting, heating and/or air conditioning. For such utilities, it is nowadays often possible to control the utility from a user device 108 by means of a wireless connection between the user device and a controller of the utility (e.g. a Wi-Fi, ZigBee, Bluetooth or even cellular connection). However, typically a user 302 should only be allowed to control the utility from his or her user device 108 if physically present in the room 300 or environment in question, or at least within some predetermined region. Normally this is assessed by means of an indoor positioning network, but in accordance with the present application the user's presence in a certain room 300 or area may be made conditional on the user device 108 being able to detect the ID or code signalled by the window 104. Either this condition could be programmed into the app itself, or the app could be required to submit the code to a server of the location-based service before access is granted. Note also that in such cases the detecting device 108 could alternatively be a dedicated remote control device.

Alternatively or additionally, the absence or presence of an ID may indicate whether privacy is warranted or that a "curtain of cover" has been opened. I.e. if an ID or other indicator is present in the light from the window, this may indicate to the detecting device 108 that a certain action is forbidden to be conducted by the detecting device, with the detecting device 108 being configured to respect this. E.g. the detecting device 108 may take the form of a user terminal such as a smartphone or tablet, and the presence of a certain ID or other predetermined indicator may indicate that a certain user action such as capturing an image (photo or video) is forbidden, with the user terminal 110 being configured to block the user from using it to capture images containing the ID. Or an equivalent effect may be implemented the other way around: a certain user action such as capturing an image (photo or video) is only allowed while the ID is detected by the user's device 108.

Other examples of location-dependent services include the taking of location-dependent payments such as road tolls, access to events, dispensing of pre-ordered products or services, and so forth.

As yet another example, the ID of the window 104 could be used to address the window in order to control it from the user device 108 via a back-channel such as an RF back-channel (e.g. Wi-Fi, ZigBee or Bluetooth). E.g. this could be used to control a window treatment such as to control the overall opaqueness or colour of the smartglass window itself, or a motorized blind or curtains. Again in such cases the detecting device 108 could be a user device running a suitable application, or could alternatively be a dedicated remote control device.

Note that the example of a window is not the only example of modulated transmission of light that falls within the scope of the present disclosure. For instance, in another example, the light source 102 may take the form of a display screen such as an LCD screen display, and the transmitting element 104 may take the form of a retro-fitted film applied over the screen. In this case the modulated layer 104 does not form part of the same unit of the screen 104, in that it is not included in the housing of the unit (casing and bezel) and the unit housing the screen was not manufactured or sold with this layer. The controller 106 is preferably built into the same housing as the rest of the appliance including the screen 104, but this is not necessarily so and it could instead be an external controller. Modulating the transmittance of the screen may be used to signal various possible information invisibly from the perspective of the user 302 (in addition to the primary function of providing visible images or videos to the user). E.g. an ID of an appliance comprising the screen could be signalled to the user device 108 by modulating the transmittance of the transmitting layer 104 of the screen. The user device 108 may then use this to address the appliance, e.g. to control it, or pair with it to transfer further data via a separate RF channel (e.g. Wi-Fi, ZigBee or Bluetooth).

In yet another example, a film or foil can be applied to a pre-existing luminaire, in order to provide coded light functionality via easy an retrofit without changing the existing luminaire. Again this could be detected by a detecting device 108 such as a user terminal (e.g. smartphone or tablet), and used for any one or more of the various purposes discussed above such as indoor navigation, providing other location dependent information, detecting whether the user terminal 108 is granted access to control the luminaire, detecting a privacy setting to be associated with the environment illuminated by the luminaire, etc.

Figure 4:
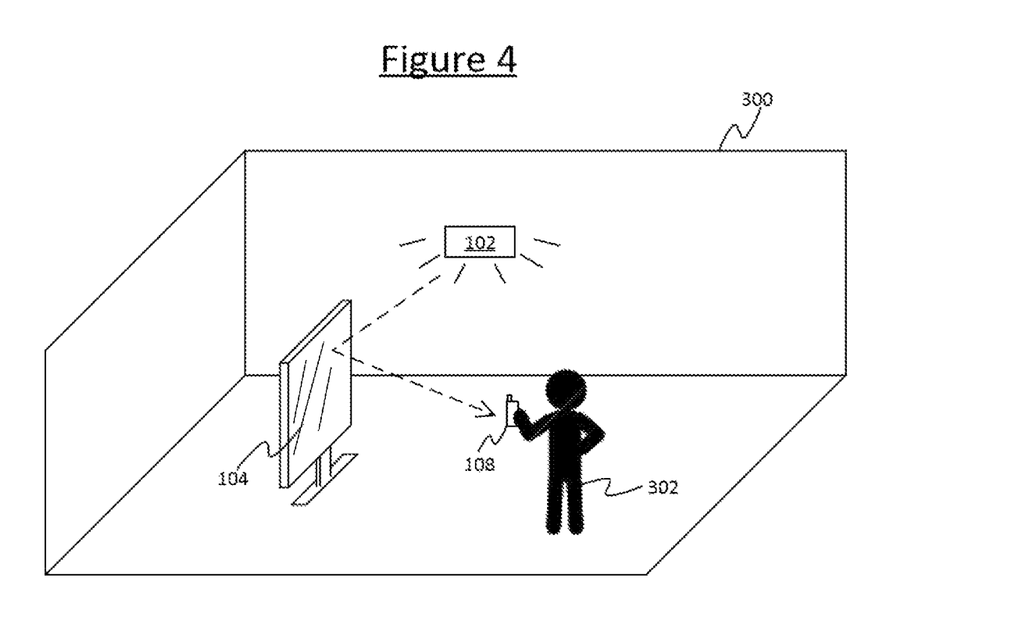
FIG. 4 schematically illustrates an example application of signalling by modulated reflection of light.
Figure 5:
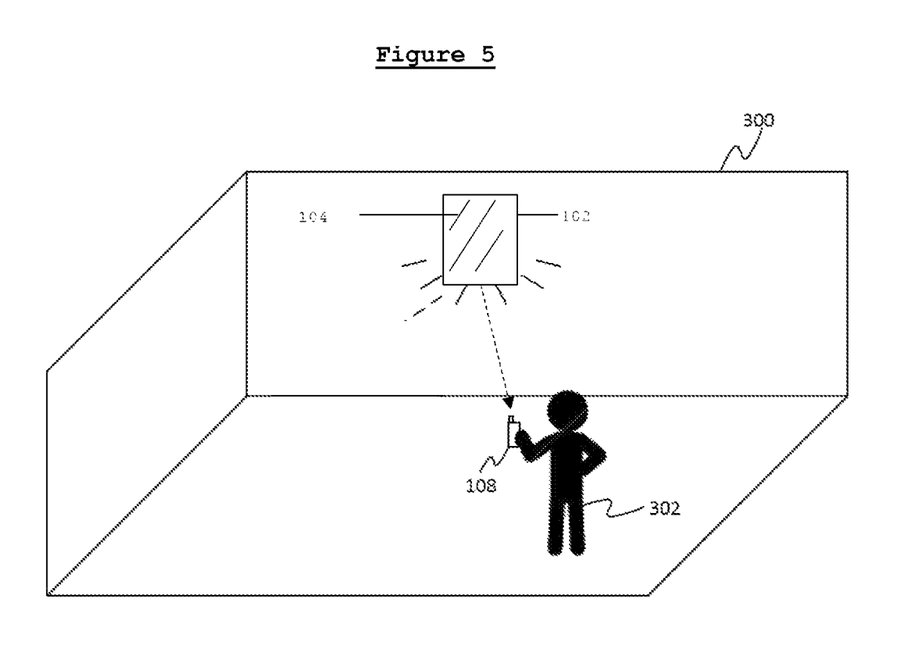

Some example applications of modulated reflectance of light are now discussed in relation to FIG. 4.

In the scenario illustrated in FIG. 4, the light source 102 takes the form of either a natural light source such as the sun, or an artificial light source such as a luminaire for illuminating the room 300 (or part of it) or a display device. By way of example, the case where the light source 102 is a luminaire will be described in the following. The non-light-emitting element 104 takes the form of a reflecting element having a variable reflectance. Specifically in the illustrated scenario, the reflecting element 104 takes the form of a front (outward facing) layer of the screen, either the front pane of the screen as built in upon manufacture, or a retro-fitted film over the front surface of the screen. The appliance housing the screen 104 may for example be a TV set, computer monitor, tablet or e-reader; or indeed with the increasing prevalence of interactive functionality in previously "dumb" appliances, any household or office appliance with an integrated screen, such as a refrigerator, coffee table, meeting room table, printer, photocopier, etc. Again, the controller 106 is preferably built into the same housing as the rest of the appliance including the screen 104, but this is not necessarily so and it could instead be an external controller.

The relative arrangement of the light source 102 and the screen 104 is such that unmodulated light from the light source 102 is reflected from the screen 104 into the camera (or other light sensor) 110 of the user device 108. The controller 106 is configured to control the variable reflectively of the screen 104 in order to embed a signal into the reflected light, for detection by the user device (e.g. again by means of an app running on the device 108).

Possible use cases are similar to those discussed above, e.g. an ID of the appliance comprising may be signalled to the user device 108 by modulating the reflectance of the reflecting layer 104 of the screen. The user device 108 may then use this to address the appliance, e.g. to control it, or pair with it to transfer further data via a separate RF channel (e.g. Wi-Fi, ZigBee or Bluetooth). As another example, the modulation of the reflecting layer (or indeed retrofitted transmitting layer) of the screen 104 could be used to communicate additional content to the user device 108 to accompany the main image content being consumed via the visible output of the screen 104. E.g. the appliance may be a TV set and the accompanying content could be content associated with the TV show or channel the user 302 is currently watching, and/or with the range of available shows or channels. In this case the user 302 consumes this content in parallel with the main show via his or her user device 108. For instance this accompanying content may comprise a summary of the current show, an electronic program guide (EPG), or interactive content. The accompanying content could be looked up based on a signalled link, pointer, code or ID embedded in the reflected light (e.g. in a data store which the user device 108 accesses via one or more networks, e.g. the Internet); and/or accompanying content could even be embedded explicitly (directly) into the reflected light.

Note that the example of a screen is not the only example of modulated reflection of light that falls within the scope of the present disclosure. For instance, a surface with a modulated reflectance could be incorporated onto the face of a signpost, billboard or other signage, or a film or foil retro-fitted over the surface of the sign or billboard. E.g. this may be used to invisibly signal a link, pointer, code or ID which the user device 108 can follow or look up in order to retrieve further information related to the sign (in addition to the visible image content of the sign itself), such as information on the product being advertised by the billboard, or safety information relating to the signpost. Or again, the related information could even be embedded explicitly (directly) into the reflected light.

As another example, a flexible, conformable layer, such as a foil or film with modulated reflectance could be attached to the exterior of practically any object, even objects that are traditionally only "dumb" objects that would not otherwise have electronic functionality or at least would not otherwise signal information. For example, such a layer could be disposed over the surface, or part of the surface, of any one or more of a variety of objects such as an item of furniture, a wall, a table, a cooker, a fridge, a freezer, a vehicle, an item of clothing, an item of crockery, a statue or other ornament, a toy, a household pet, and so forth. Also, a variable transmittance foil or film could be added to certain objects, e.g. to the transparent door of an oven, with the light source 102 being the internal light that shines when the oven is on. Because of the low power consumption in particular, these films or foils are particularly suitable for wearables or moveable objects (e.g. a "tag" to people or clothes).

It will be appreciated that the above embodiments have been described only by way of example.

In the various embodiments above (in the case of either modulated reflection or transmission), the reflecting or transmitting element may be a single uniform layer or surface, i.e. capable of only one reflectance or transmittance value across the whole layer at any given time. Or even if the reflecting or transmitting element is not a single uniform layer or surface, it may still be the case that the modulation is only temporal and not spatial (so there could be a patterned or non-uniform reflectivity or transmittance, but the whole pattern is modulated together in time, with no information encoded spatially into the pattern or non-uniformity)

Alternatively however, it is also possible that the surface is segmented into a plurality of discrete areas, with the reflectance or transmittance of each segment (each area) being individually variable. In this case, the information may be encoded by means of a specific sequence of switching segments. That is, the data may be encoded by both the temporal and spatial variations together, i.e. the temporal variation of the spatial pattern. This spatially distributed encoding can be beneficial when the switching speed of each segment is relatively low. Alternatively a separate, individually decodable sub stream could be encoded into each segment.

Note: where it is said the non-light emitting element is segmented, this does not mean it is pixelated. I.e. it is still a non-matrix element. In a matrix panel each pixel is addressed individually by means of at least two lines: there are rows and columns and at a cross point of a row and column the combination of signals determines the state of the pixel. In an active-matrix panel there is a switching element (typically a transistor) at each cross point. For segments on the other hand, each segment is directly driven by its own driver and its own respective signal, without any switching element to direct a signal from a common line to a selected segment. So while a segment has at least one "own" lead (the second one may be a common electrode), in a matrix panel pixels share their leads with other pixels and switching elements make sure that each pixel gets the desired value. Indeed a matrix panel typically has row and column drivers, i.e. a driver shared between all the pixels of a given row and a driver shared between all the pixels of a given column; whereas a segmented arrangement would have one respective driver with direct connections to each segments.

Further, the pixels of a matrix are regularly shaped (or at least have a regular repeating layout), whereas in a non-matrix structure this is not necessarily the case. Consider for example a sign with a name on it: if one can switch on the individual letters of the sign (i.e. letters as a whole) then that would be a segment display; whereas a matrix display would require multiple identical, patterned, equidistant, repeating matrix elements to represent more complex shapes. So both a segment and a pixel both have contours defining the shape, but in a non-matrix display, these elements are not regularly spaced or patterned, whereas in a matrix they are.

Further, while the above has been largely described in terms of modulating light in the visible spectrum, with the high frequency of the modulation being the means by which the modulation is kept invisible to the user 302, this is not necessarily the case in all possible embodiments. Alternatively, the modulated light may be outside the visible spectrum, i.e. infrared or ultraviolet (in which case the light source 102 could emit only light outside the visible spectrum, or could emit light both inside and outside the visible spectrum but the transmitting or reflecting element 104 modulates only a component outside the visible spectrum). As another alternative, invisibility may be achieved by modulating a parameter of the light that is not visible to the human eye, but can still be detected by a photosensor such as a camera or photodiode, such as polarization.

Note also that the sun is not the only source of naturally occurring light, and a luminaire is not the only possible source of artificial light. In other embodiments other artificial or natural light sources 102 may be used, e.g. bioluminescent light sources, chemiluminescent light sources, etc.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor or other unit may fulfil the functions of several items recited in the claims. The mere fact that certain measures are recited in mutually different dependent claims does not indicate that a combination of these measures cannot be used to advantage. A computer program may be stored/distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope.

The invention claimed is:

1. A system comprising:
    a non-light-emitting element disposed so as to transmit and/or reflect light from a light-emitting element, the non-light-emitting element having a variable transmission or reflectance respectively, and the non-light-emitting element being separate from the light-emitting element at least in that the non-light-emitting element and the light-emitting element are not controlled by a same device, wherein the light-emitting element is selected from natural light, display device or a household luminaire; and
    a controller configured to control the transmission or reflectance of the non-light-emitting element in order to temporally modulate the light, wherein the non-light-emitting element uses an electrophoretic or suspended particle technology selected from e-INK or smart glass, to thereby embed data into the transmitted and/or reflected light in a manner imperceptible to human vision;
    wherein the non-light-emitting element is arranged to transmit or reflect the light towards a mobile detecting apparatus housed in a unit separate from the light-emitting element and non-light-emitting element, in order for the embedded data to be detected by the detecting apparatus;
    wherein the transmission or reflectivity of the non-light-emitting element is variable in that across an area of the non-light-emitting element the transmission or reflectance can be varied only uniformly, such that said modulation is performed by temporally varying the transmission or reflectance uniformly across said area.

2. The system of claim 1, wherein the light has a primary function that is perceivable to a human user, and the embedding of said data is a secondary function not perceivable to the user.

3. The system of claim 1, wherein the light emitting element does not embed data in the light it emits, such that the only modulation for purpose of embedding data in the light is by said modulation of the transmission or reflectance of the non-light-emitting element.

4. The system of claim 1, wherein the light is ambient light illuminating an environment occupied by a user.

5. The system of claim 4, wherein the light-emitting element is a luminaire.

6. The system of claim 1, wherein the light-emitting element is a manmade light source.

7. The system of claim 6, wherein the light-emitting element is a display screen and the non-light emitting element is a retrofitted layer retrofitted over the display screen.

8. The system of claim 1, wherein the light emitting element is separated from the non-light emitting element by no less than 10 cm of air or free space between any two respective points on the light-emitting element and non-light emitting elements, such that the light propagates through the air or free space before being transmitted or reflected by the non-light-emitting element.

9. The system of claim 1, wherein the non-light-emitting element is one of, or a retrofitted layer retrofitted over one of:
a window;
a surface of a user terminal, kitchen appliance, item of furniture, building, vehicle, or item of clothing or other wearable item; or
a signpost, billboard or other signage.

10. The system of claim 1, wherein the modulation consists only of temporally varying the transmission or reflectance uniformly across the entirety of said area.

11. The system of claim 1, wherein the light is in the visible spectrum, and the controller is configured to perform said modulation at a frequency beyond human visual perception.

12. The system of claim 11, wherein the data comprises a sequence of symbols, said frequency being a symbol frequency of the symbols, and wherein the symbol frequency is greater than or equal to 100 Hz.

13. The system of claim 1, wherein the mobile detecting apparatus is selected from a smartphone, tablet and laptop.

14. A system comprising:
a non-light-emitting element disposed so as to transmit and/or reflect light from a light-emitting element, the non-light-emitting element having a variable transmission or reflectance respectively, and wherein the non-light-emitting element is applied to a surface receiving light from the light-emitting element wherein the light-emitting element is selected from natural light, display device or a household luminaire; and
a controller configured to control the transmission or reflectance of the non-light-emitting element in order to temporally modulate the light, wherein the non-light-emitting element uses an electrophoretic or suspended particle technology selected from e-INK or smart glass, to thereby embed data into the transmitted and/or reflected light in a manner imperceptible to human vision;
wherein the non-light-emitting element is arranged to transmit or reflect the light towards a mobile user apparatus, wherein the mobile user apparatus is selected from a smartphone, tablet and laptop, in order for the embedded data to be detected by the mobile user apparatus;
wherein the transmission or reflectivity of the non-light-emitting element is variable in that across an area of the non-light-emitting element the transmission or reflectance can be varied only uniformly, such that said modulation is performed by temporally varying the transmission or reflectance uniformly across said area.

15. The system of claim 14, wherein the surface is selected from a window a user terminal, TV, kitchen appliance, item of furniture, building, vehicle, item of clothing, signpost or billboard.

16. A signaling method comprising:
using a non-light-emitting element to transmit and/or reflect visible light emitted from a light-emitting element, wherein the light-emitting element is selected from natural light, user terminal or a household luminaire, the non-light-emitting element having a variable transmission or reflectance respectively, and the non-light-emitting element being separate from the light-emitting element at least in that the non-light-emitting element and the light-emitting element are not controlled by a same unit, wherein the transmission or reflectivity of the non-light-emitting element is variable in that across an area of the non-light-emitting element the transmission or reflectance can be varied only uniformly, such that said modulation is performed by temporally varying the transmission or reflectance uniformly across said area;
controlling the transmission or reflectance of the non-light-emitting element in order to modulate the light, wherein the non-light-emitting element uses an electrophoretic or suspended particle technology selected from e-INK or smart glass, at a frequency beyond human visual perception, and to thereby imperceptibly embed data into the light in a manner imperceptible to human vision;
directing the transmitted or reflected the light towards a mobile detecting apparatus housed in a unit separate from the light-emitting element and non-light emitting element, such that the embedded data is detected by the detecting apparatus.

* * * * *